MAGNETIC MEMORY

Filed Nov. 21, 1963 2 Sheets-Sheet 1

INVENTORS
LAWRENCE R. BICKFORD, JR.
ROBERT F. ELFANT
BY Stephen J. Limanek
ATTORNEY 3,267,447
Patented August 16, 1966

3,267,447
MAGNETIC MEMORY

Lawrence R. Bickford, Jr., Tokyo, Japan, and Robert F. Elfant, Yorktown Heights, N.Y., assignors to International Business Machines Corporation, New York, N.Y., a corporation of New York Filed Nov. 21, 1963, Ser. No. 325,337
10 Claims. (Cl. 340—174)

Figure 1:
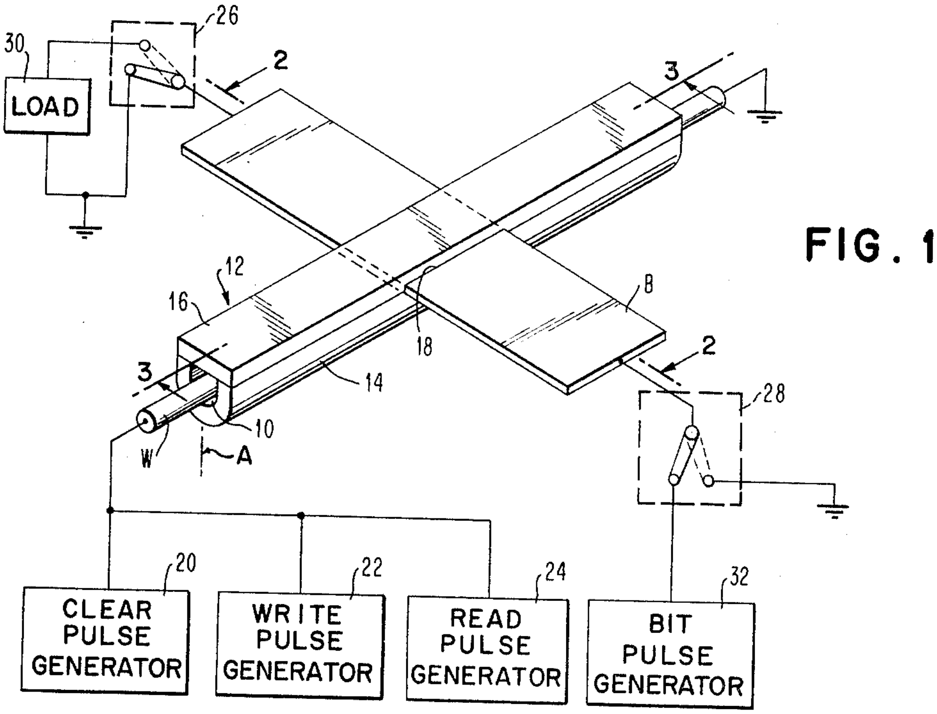

This invention relates to improved magnetic storage systems and more particularly to more efficient memory systems amenable to mass or batch fabrication techniques having higher signal-to-noise ratios.

In a known memory system amenable to mass or batch fabrication techniques, a magnetic tubular element having a relatively high degree of remanence is threaded in a first direction through a first hole or aperture by a first or word conductor and in a second direction transverse to the first direction through a second hole or aperture by a second or bit conductor. This structure, when provided with a plurality of second conductors passing through a corresponding plurality of parallely arranged holes, resembles somewhat a flute, and, therefore, this memory system is commonly referred to as a flute memory. A current pulse of a given polarity is passed through the first conductor to provide a saturating magnetic field in the magnetic element circumferentially about the first conductor without producing a flux linkage with the second conductor. In this condition of the magnetic element of the memory, a 0 bit is said to be stored therein. In order to store a 1 bit in the magnetic element, a current pulse of either negative or positive polarity is passed through the second conductor providing a second magnetic field which is perpendicular to the saturating field produced by the current pulse passed through the first conductor. The time relationship of current pulses in the first and second conductors is such that the saturating and second magnetic fields are produced concurrently but with the second field terminating after the termination of the saturating field. By utilizing such a pulse program, a flux linkage is produced with the second conductor to provide the 1 bit condition in the magnetic element. This memory system is read out or interrogated by passing a current pulse through the first conductor and sensing with the second conductor. If the magnetic element of the memory was in a 0 bit condition, an output voltage is not produced in the second conductor since there was no flux linkage with the second conductor when the 0 bit was stored and there is no flux linkage with the second conductor when the interrogating current pulse is passed through the first conductor which is orthogonally arranged with respect to the second conductor. If the magnetic memory was in a 1 bit condition, an output voltage is produced in the second conductor since there was flux linkage with the second conductor which is destroyed by the interrogating current pulse. Accordingly, it can be seen that after reading out the 0 bit or the 1 bit, the magnetic element of the memory contains a circumferential field about the first conductor without a flux linkage of the second conductor. This latter condition is referred to as the clear condition of the memory which, of course, destroys the information previously stored therein. For a more detailed description of the magnetic memory described hereinabove, reference may be had to commonly assigned applications Serial No. 206,356 filed by R. F. Elfant and K. R. Grebe and Serial No. 250,908 filed by R. F. Elfant and N. J. Mazzeo.

It is also known that the storage of information in the vicinity of each of the points of intersection of the first and second conductors may be improved by laying an uncured piece of a ferrite-resinous mixture along the axis of the magnetic tubular element over the first and second conductor points of intersection. By utilizing such an overlay there is provided at the intersections more uniform flux storage resulting in more reliable memory elements, as explained more fully in commonly assigned application Serial No. 253,467 filed by E. A. Bartkus et al.

In these known flute memories the second or bit conductors are disposed in apertures having a substantially circular configuration. These circular apertures, which form zones of high reluctance compared to the reluctance of the material of the tubular element, each serve to provide a demagnetized zone for a distance axially along the magnetic tubular element corresponding to the diameter of the aperture when a 0 bit of information is stored at a particular one or more of the word and bit conductor intersections or when the memory element of this bit location is cleared. When a 1 bit of information is stored at a particular one or more of the word and bit conductor intersections, the magnetic material of the demagnetized zone at this bit location forms a portion of the flux path linking the bit conductor, which conductor is used as a sense line of the flute memory during the read out operation.

It is an object of this invention to provide an improved batch fabricated memory or storage system.

Another object of this invention is to provide a batch fabricated memory system having a higher signal-to-noise ratio.

A further object of this invention is to provide a batch fabricated memory system which more efficiently utilizes the available magnetic tubular material.

Yet another object of this invention is to provide more highly demagnetized zones in the magnetic tubular element of batch fabricated memory systems.

Still a further object of this invention is to reduce the resistance of the bit conductor of a batch fabricated memory system having a given magnetic tubular element.

Still another object of this invention is to reduce the self-inductance of the word conductor of a batch fabricated memory system having a given magnetic tubular element.

In accordance with the present invention, an improved memory system of the flute type is provided which includes a hollow magnetic tubular element having an aperture therein passing through the wall thereof which has a transverse cross-sectional dimension in the direction of the axis of the element greater than its transverse cross-sectional dimension perpendicular to the axis, a first or word conductor is disposed within the element along the axis thereof and a second or bit conductor is disposed within the wall aperture. When the tubular element includes an overlay of magnetic material the axial dimension of the aperture is preferably at least as long as the width of the overlay so as to utilize the advantages of shape anisotropy in the storing of 1 bits of information in the memory system of the invention.

An important advantage of the present invention is that a flute type memory is provided which has an improved signal-to-noise ratio without decreasing the packing density of the stored information.

An important feature of the present invention is that a flute type memory is provided which may utilize strip transmission lines and derive all the concomitant advantages thereof.

The foregoing and other objects, features and advantages of the invention will be apparent from the following more particular description of preferred embodiments of the invention, as illustrated in the accompanying drawings.

Figure 2:
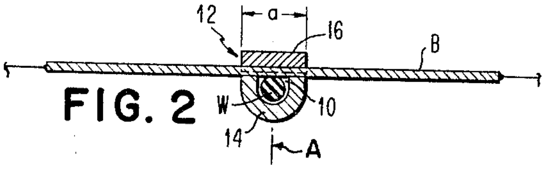
Figure 3:
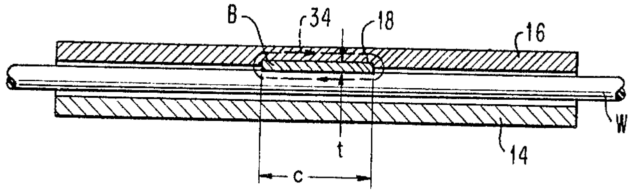
Figure 4:
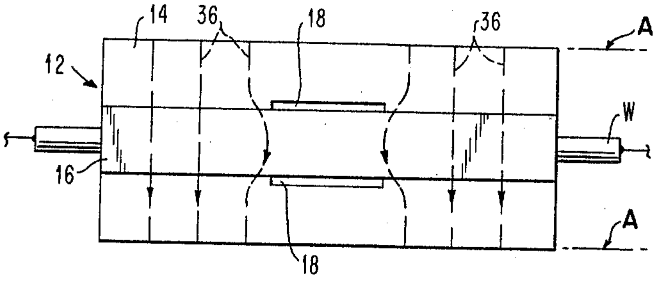
Figure 5A:
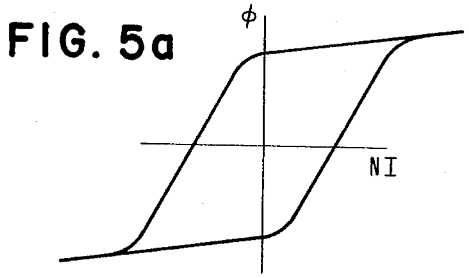
Figure 5B:
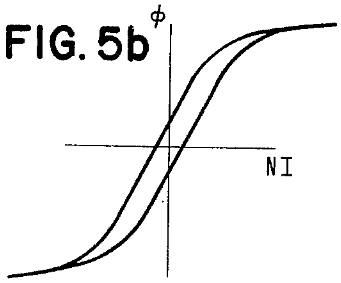
Figure 6:
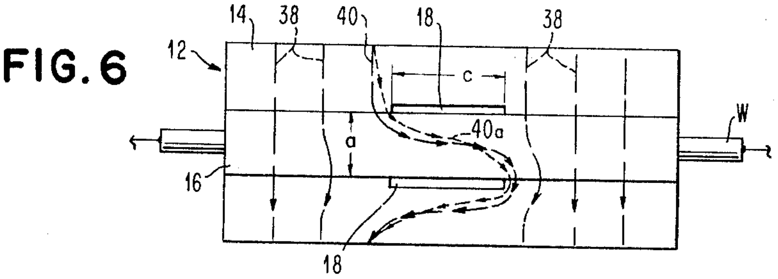
Figure 7:
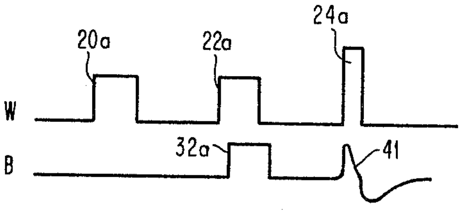
Figure 8:
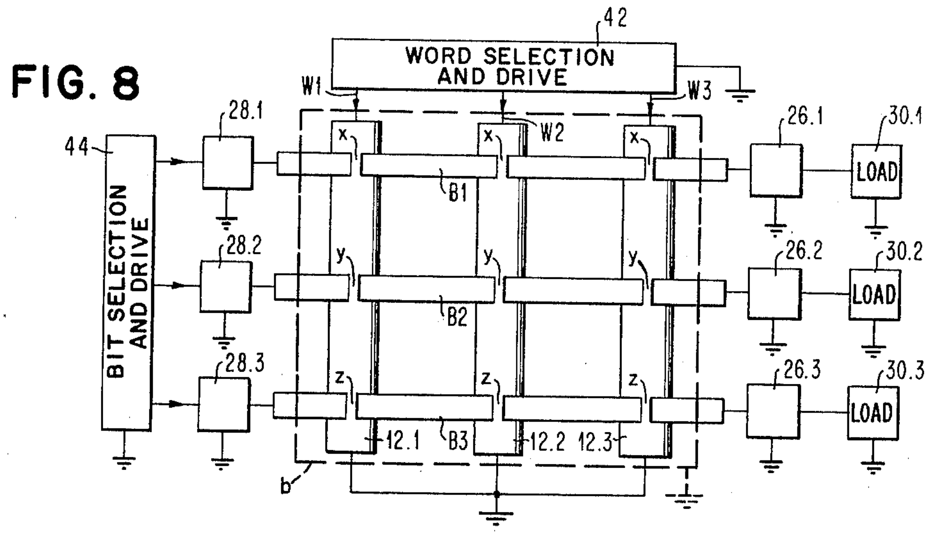

In the drawings:

FIG. 1 illustrates an embodiment of the magnetic memory system of the present invention, FIG. 2 illustrates a cross section of the system shown in FIG. 1 taken transversely through the magnetic element of the system at 2—2, FIG. 3 illustrates a cross section of the magnetic memory system of the present invention shown in FIG. 1 taken through the longitudinal axis of the magnetic element at 3—3, FIG. 4 is a developed view of the magnetic element of the system shown in FIG. 1 opened longitudinally along line A as indicated at FIGS. 1 and 2, illustrating flux distribution therein in one magnetic state of the element, FIG. 5*a* is a plot of flux $\phi$ versus applied field NI for first magnetic element material which may be used in the system shown in FIG. 1, FIG. 5*b* is a plot of flux $\phi$ versus applied field NI for second magnetic element material which may be used in the system shown in FIG. 1, FIG. 6 is a developed view of the magnetic element of the system shown in FIG. 1 opened longitudinally along line A as indicated in FIGS. 1 and 2, illustrating flux distribution therein in a second magnetic state of the element, FIG. 7 illustrates a pulse program which may be employed to operate the system of the present invention shown in FIG. 1, and FIG. 8 is a memory system including a magnetic array according to another embodiment of this invention.

Referring to the drawings in more detail, there is shown in FIG. 1 an embodiment of the flute type magnetic memory system of the present invention which includes a first or word conductor W passing through an axially disposed first opening 10 in a magnetic element 12 formed by a magnetic U-shaped trough 14 and a magnetic plate or overlay 16 forming closed magnetic paths substantially concentrically around and the word conductor W. A second or bit conductor B having preferably a rectangular transverse cross section is disposed in orthogonal relationship with respect to the first conductor W but displaced and insulated therefrom and passing through the magnetic element 12 in a second aperture or hole 18 formed by the trough 14 and plate 16. The aperture 18 may be made to correspond with the cross-sectional area of the conductor B by interposing the conductor B between the U-shaped trough 14 and the plate 16 before forming the final magnetic structure. The magnetic element 12 is illustrated as being formed by the trough 14 and the plate 16 but it should be understood that other forms such as those having a cylindrical cross section or block or bar forms are also adaptable for use. The first conductor W and the second conductor B may be separated from one another in a range of distances. However, the distance between conductors W and B should be such that when both conductors are energized, magnetic fields produced by each are combined at least in part to produce a resultant field linking both conductors W and B.

The word conductor W is connected at one end to ground and at the other end to a clear pulse generator 20, a write pulse generator 22 and read pulse generator 24. The second conductor B is connected at one end to first switching means 26 and at the other end to second switching means 28. The first switching means 26 is operative to connect the one end of the conductor B either to ground or to a load 30, while the second switching means 28 is operative to connect the other end of conductor B to ground or to a bit pulse generator 32. The first and second switching means 26 and 28 are preferably ganged so that when one end of the bit conductor B is connected to ground by the first switching means 26, the other end of conductor B is connected by the second switching means 28 to the bit pulse generator 32, and, when the one end of conductor B is connected by the first switching means 26 to the load 30, the other end of conductor B is connected by the second switching means 28 to ground.

In FIG. 2 there is illustrated a cross section of a portion of the memory system illustrated in FIG. 1 of the drawing taken transversely through the magnetic element 12 at 2—2. It can be seen from FIG. 2 that the conductor B passes through the magnetic element 12 between the trough 14 and the plate or overlay 16, having a breadth or width *a*, in substantially orthogonal relationship with respect to the conductor W which is disposed within the U-shaped trough 14. At least one of the conductors W and B is provided with an insulating coating so as to avoid ohmic contact therebetween at the junction thereof.

In FIG. 3 of the drawing there is illustrated a cross-sectional view of a portion of the system illustrated in FIG. 1 taken along the longitudinal axis of the magnetic element 12 at 3—3. FIG. 3 shows a magnetic field 34 through the magnetic plate or overlay 16 produced by current flowing through the conductor B which has a breadth or width *c* and a thickness *t* equal to that of the dimensions of the transverse cross-sectional area of the aperture 18.

FIG. 4 is a developed view of the magnetic element 12 of the system shown in FIGS. 1, 2 and 3 opened longitudinally along line A as indicated in FIGS. 1 and 2. FIG. 4 shows the aperture 18 passing through the magnetic element 12 forming a longitudinal slit on each of opposite sides of the element 12 with the conductor B removed from the aperture 18. Since the magnetic element 12 is made of magnetic material having magnetic characteristics as illustrated in, for example, FIGS. 5*a* or 5*b*, it can be seen that the aperture 18 produces a zone of high magnetic reluctance which tends to prevent the establishment of a flux path concentrically about the conductor W within the length of the magnetic element 12 which includes the aperture 18 when a current is passed through the word conductor W. The magnetic field produced in the magnetic element 12 by current passing through the word conductor W provides a remanent flux pattern as indicated by lines 36 in FIG. 4, which pattern may represent the 0 bit information state.

The 1 bit information state in the memory system of the present invention is illustrated in FIG. 6 by the remanent flux pattern indicated by lines 38 and 40. It can be seen that a portion of the flux indicated by line 40 passes through the plate or overlay 16 between the ends of the aperture 18 so as to link the conductor B when it is disposed within the aperture 18. The flux pattern indicated by lines 38 and 40 is produced by concurrently passing current through the word conductor W to produce a flux pattern similar to that indicated in FIG. 4 by lines 36 and through the bit conductor B to produce a field pattern around the conductor B as indicated by line 34 in FIG. 3. The field 34 of FIG. 3 is used to direct a portion of the flux 36 of FIG. 4 through the overlay 16 between the ends of the aperture 18 to link the bit conductor B.

The memory system of the present invention may be operated by applying pulses to the word conductor W and the bit conductor B in a pulse pattern indicated in FIG. 7 of the drawing wherein pulses passing through the magnetic element 12 in the word conductor W are indicated as W pulses and the pulses produced in the bit conductor B are indicated as B pulses.

As indicated hereinabove the material of the magnetic element 12 may be made of any type of magnetic material which exhibits remanence. Accordingly, it is not necessary that the magnetic material employed in the magnetic element 12 be of the type which exhibits a rectangular loop characteristic. It should be understood, however, that magnetic material of the rectangular loop type may also be used as material for the magnetic element 12. The curve shown in FIG. 5*a* is a plot of flux $\phi$ versus applied field NI for magnetic material which provided very satisfactory operation of the system illustrated in FIG. 1. The hysteresis loop defined by the curve in FIG. 5a is a 60-cycle-hysteresis loop produced by alternately saturating the material of the magnetic element 12 circumferentially with respect to the word conductor W by applied magnetic fields and obtaining a trace on an oscilloscope connected to a standard interrogating circuit and a conductor having a similar relationship to the material of the magnetic element 12 as the word conductor W. Since the bit conductor B is in a right-angle relationship with conductor W, the second conductor B cannot be utilized to obtain the traces for the hysteresis curve of FIG. 5a when current is passed through the word conductor W to establish the magnetic fields.

In the operation of the magnetic memory system of the present invention, the system is first cleared of all previously stored information before information is fed into the system, as is general with most memory systems, by applying a pulse 20a indicated in FIG. 7 from the clear pulse generator 20 of the system of FIG. 1. The magnitude of the pulse 20a is such that a substantially saturating magnetic field is applied to the magnetic element 12. The remanent flux pattern produced by the clear pulse 16a is indicated in FIG. 4 by the lines 36. In order to store a 0 bit into the magnetic element 12, a pulse 22a illustrated in FIG. 7 is subsequently applied to the word conductor W by the write pulse generator 22 of FIG. 1. Since the 0 bit pulse 22a is similar to the clear pulse 20a, the pulse pattern produced by the write pulse 22a is similar to that produced by the clear pulse 20a and, therefore, the remanent flux pattern produced by the write pulse 22a is also remanent flux pattern which is shown in FIG. 4. When a 1 bit is to be written into the magnetic element 12, a write pulse 22a from the write pulse generator 22 of FIG. 1 is applied to the first conductor W and concurrently therewith for at least a portion of time interval thereof, a pulse 32a is applied to the bit conductor *b* from the bit pulse generator 32. The duration of the pulse 32a is such that it is terminated after the termination of the write pulse 22a produced by the write pulse generator 22. The magnitude of the 1 bit pulse 32a is substantially less than the magnitude of the write pulse 22a since the pulse 32a should not produce a saturation field in the magnetic element 12 and since that all that is required by the field produced by the pulses 32a is to initiate a uniform direction of stability to the domains of the portion of the material of the magnetic plate or overlay 16 disposed over the aperture 18. The direction of the magnetic field produced by the pulse 32a is indicated in FIG. 3 by line 34. The magnitude of this field must be controlled so that in the absence of the saturating field produced by the write pulse 22a an erroneous flux orientation is not created about the bit conductor B. The importance of the magnitude of this field will become apparent after the embodiment of the invention illustrated in FIG. 8 of the drawing has been described. It can be seen from FIG. 6 that the two pulses 22a and 32a produce a resultant remanent flux indicated by line 40 in the area of the magnetic element 12 at the intersection of the conductors W and B which links both the word conductor W and the bit conductor B. By following the path of the resultant flux 40 as indicated in FIG. 6, it can be seen that the flux 40 encircles the aperture 18 by passing from left to right through the overlay 16 between the ends of the aperture and completing its path through the U-shaped trough 14.

In order to detect this 1 bit condition in the magnetic element 12, a read pulse 24a as illustrated in FIG. 7 from the read pulse generator 24 is applied to the word conductor W. The read pulse generator 24 is designed so as to produce a pulse of the same polarity as that of the clear and write pulses 20a and 22a but of lower energy content when it is desired to read out the one bit of information nondestructively, as is explaiend more fully in a commonly assigned application Serial No. 302, 814 filed by R. F. Elfant. However, it should be understood that the system of the present invention is also operable by using read pulses which are of the same or opposite polarity and of the same or greater amplitude than the write pulse regardless of energy content. When the read pulse 24a is applied to the word conductor W, the flux indicated by line 40 temporarily surrounds the conductor W along a more direct or shorter circumferential path indicated by flux path 40a to produce the output pulse 41 indicated in FIG. 7. After the termination of the read pulse 24a, the flux pattern is restored to that indicated by lines 38 and 40 of FIG. 6. The output voltage 41 is detected by the second bit conductor B which during the read out time is connected by the first and second switches 26 and 28 to the load 30. When clearing or when storing a 0 bit in the element 12 after a 1 bit has been stored therein, the clear pulse 20a or the write pulse 22a is applied to the word conductor W of FIG. 1 to produce flux indicated by lines 36 of FIG. 4. Since the aperture 18 acts as a high reluctance, circumferential flux lines 36 are set up in the magnetic element around the word conductor W only on the sides of the aperture 18 as indicated in FIG. 4. If the flux lines 36 are sufficiently strong, the closed path of the remanent flux 40 of FIG. 6 is destroyed and the remaining portion of the flux 40, that passing through the overlay 16 between the ends of the aperture 18, cannot sustain itself due to the high reluctance aperture 18. The break up of the flux 40 provides a demagnetized zone in the vicinity of the bit conductor B which places the element 12 in the 0 or cleared condition. Since this zone is demagnetized, it can be seen that any subsequent read out of information by the application of a read pulse 24a to the word conductor W will not provide an output voltage on the bit or sense conductor B. It has been found that the demagnetized zone defined by the slits in the magnetic element 12 formed by the aperture 18 provides a higher signal-to-noise ratio with an increase in the ratio of the length *c* of the aperture 18 to the width *a* of the overlay 16. In one memory system of the present invention the length of the slit aperture 18 was made equal to approximately twice the diameter of a circular aperture employed in a prior art system while maintaining all other factors constant. The signal-to-noise ratio of the system of the present invention was found to be approximately twice that of the prior art system. This marked improvement in performance over the prior art system is believed to be due to the fact that the circular apertures were not as effective in demagnetizing the magnetic zone in the vicinity of the bit conductor B. Such demagnetization is particularly important when the flute memory is operated in the unipolar word mode, since in this mode of operation there is no flux reversal, merely a change in flux distribution.

It should be noted that to provide the improved performance in accordance with the teachings of the present invention, it is not necessary to vary the transverse cross-sectional dimensions of the magnetic element 12. Thus, a flute memory which operates satisfactorily with the use of circular apertures of a diameter *d* through the walls of the magnetic element may be improved simply by replacing the circular apertures by longitudinal slits of a width *t* equal to the diameter *d*. At first blush it appears that the improvement may be obtained only at the expense of increased length of the magnetic element, however, it has been found that the bit spacing in flute memories is determined by handling capabilities during the manufacturing process and not by the relatively short desired length of the longitudinal slits.

Although the memory system of the present invention has been illustrated and described as including a bit conductor B having a rectangular cross-sectional area, it should be understood that the invention may be practiced by using a bit conductor B having a circular cross-sectional area provided that the aperture 18 has a geometry which provides the slits or rectangular openings in the sides of the magnetic element 12. However, bit conductors B having a cross-sectional area equal to the area of the aperture 18 are preferred since the resistivity per unit length of the bit conductor is reduced and the self-inductance of the bit conductor is reduced due to the increase in the cross-sectional area of the conductor. A lower resistivity and a lower self-inductance in the bit conductor permits longer lines in a two dimensional memory for a given driving voltage and a stronger output signal when the bit conductor is used as a sense conductor during the read out operation. It can also be seen by referring to FIG. 3 of the drawing that the bit conductor B having the rectangular cross-sectional area further improves the operation of the memory system by concentrating the magnetic field 34 in an area where it can more effectively direct the flux 40 around the bit conduuctor B to store a 1 bit of information. It is also pointed out that the longitudinal slits reduce the back voltage in the word conductor W since more of the magnetic material of the element 12 is associated with the storage of information and less is disposed in the element 12 between the bit positions.

By employing a bit conductor B which has a width *l*, greater than the width *w* of the overlay 16 additional advantages, i.e., those of shape anisotropy can be obtained in the practice of the present invention. Material can be made to appear different magnetically when viewed in different directions. Thus, by employing a bit conductor or by providing a slit of dimension *l* which is greater than the width *w* of the overlay 18 less relative reluctance appears in the overlay 16 between the ends of the aperture 18 in the direction parallel to the longitudinal axis of the magnetic element than in the direction transverse thereto so as to more easily direct the flux 40 shown in FIG. 6 around the bit conductor B for storing a 1 bit in the element 12.

It should be understood, of course, that although separate clear, write and read pulse generators 20, 22 and 24 are shown connected to the first conductor W in FIG. 1 of the drawing, a single pulse generator may be substituted therefor. Furthermore, separate means coupled to each of the generators may be provided to control the timing and duration of each of the pulses applied to the word and bit conductors W and B.

It should also be understood, that the polarity of the voltage produced by bit pulse generator 32 may be the same as or opposite to that produced by write pulse generator 22. Also, if a bipolar output is desired in conductor B, a pulse of one polarity is produced by the bit pulse generator 32 to represent a 1 bit and a pulse of the opposite polarity is produced by the generator 32 to provide a 0 bit of stored information, when these pulses are applied to conductor B in the proper time relationship with respect to the write pulse from generator 22.

Referring now to FIG. 8 of the drawing, a magnetic memory plane according to this invention, suitable for use in a high speed computer, is schematically illustrated. The memory plane is word organized having a plurality of word column conductors W1, W2 and W3 and a plurality of bit row conductors B1, B2 and B3. Associated with and surrounding each word conductor W1, W2 and W3 is a magnetic member 12.1, 12.2, and 12.3 each of which may be, for example, similar to that illustrated in FIG. 1 of the drawing or of a cylindrical configuration. Along the length of each member 12.1, 12.2 and 12.3 the bit row conductors B1, B2 and B3 are disposed so that each couples a different portion, such as at *x*, *y* and *z*, of the material of the members 12.1, 12.2 and 12.3. The word column conductors W1, W2 and W3 have one end connected to ground while the other end is connected to a word selection and drive means 42 capable of providing address selection of a particular word line W1, W2 or W3, and the pulse generation corresponding to clear, write or read generators 20, 22 and 24 of FIG. 1. The bit row conductors B1, B2 and B3 are connected to a bit selection and drive means 44 through a respective switch 28.1, 28.2 and 28.3 and are further connected to loads 30.1, 30.2 and 30.3 through a respective switch 26.1, 26.2 and 26.3. The means 44 provides the function of bit addressing and pulse generation corresponding to the bit pulse generator 32 of FIG. 1, while each switch 28.1, 28.2 and 28.3 performs a function similar to that of switch 28 and each switch 26.1, 26.2 and 26.3 performs a function similar to that of switch 26 of FIG. 1. The bit lines B1, B2 and B3 are shown in the form of strip lines having a return path *b*. Strip line return paths may also be employed which further reduces the self-inductance of bit lines or bit conductors of the present system.

In the operation of the magnetic memory plane illustrated in FIG. 8 of the drawing, during the write operation a particular word line W1, W2 or W3 is energized and partial concurrence therewith and in overlapping time sequence the bit row conductors B1, B2 and B3 are energized only when a binary 1 is to be stored in a particular bit position. For those bit positions of members 12.1, 12.2 and 12.3 in which the corresponding word conductor is not energized, there is no change in remanent flux distribution in the material of the member coupled by the bit conductors B which are energized for storing a binary 1 in the particular storage position along a selected one of members 12.1, 12.2 and 12.3. The magnitude of the energy in the bit conductors B is maintained at a relatively low level so as to prevent the erroneous flux distribution changes at unselect bit locations. For read out, a selected conductor W1, W2 or W3 is energized by the word selection and drive means 42 in accordance with the teachings of the present invention as described hereinabove to apply a word or read field to the particular members 12.1, 12.2 or 12.3 while the switches 26.1, 26.2 and 26.3 and 28.1, 28.2 and 28.3 are conditioned to connect the loads 31.1, 31.2 and 31.3 to the row conductors B.

While the memory system shown in FIG. 1 employs the conductor B as both an input conductor and an output conductor by proper operation of the switches 26 and 28, it should be understood that, if desired, another conductor may be provided in the aperture 18 similarly disposed as conductor B in manifestation of the output signal, thereby eliminating the necessity of the switches 26 and 28.

With respect to a memory system of the present invention which operated satisfactorily with destructive and nondestructive reading, the member 12 of FIG. 1 was made of T–55 material of the type disclosed in U.S. Patent No. 2,950,252 assigned to the assignee of this application and had an effective inside diameter of 6 mils and an outside diameter of 20 mils. Output voltages for 1's and 0's of 20 and 5 millivolts, respectively, have been obtained from conductors B when using a read current of 1000 milliamperes, a write current of 1000 milliamperes and a bit current of 80 milliamperes.

It should be understood that the memory of FIG. 8 of the drawing may be mass fabricated by employing a process as disclosed in a copending application, Serial No. 206,326, filed June 29, 1962 in behalf of J. M. Brownlow et al., and assigned to the assignee of this application. Furthermore, it has been also found that when an overlayer, such as plate 16 of FIG. 1, is provided, it is at times desirable to use an overlayer made of storage or relatively remanent material while the remainder of the magnetic element, for example, the U-shaped trough 14 of FIG. 1, is made of only transformer type material. With this latter combination of materials for the magnetic element, an increase in magnetic field for a given word current can be obtained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic information storage system comprising:

(a) a magnetic member having an aperture therethrough forming a slit in each of two opposite sides of said member made of material exhibiting different stable states of flux remanence the distance between said two slits in said magnetic member being less than the length of either one of said slits, (b) first means for applying a first magnetic field to said member in a direction transverse with respect to the longitudinal dimension of the slits, (c) second means applying a second magnetic field directed transverse with respect to said first field which is of insufficient magnitude of and by itself to cause an appreciable flux change in the first state, said first and second magnetic fields being applied concurrently to establish said member in a second state of flux to represent a second information value, and (d) third means operative to apply a third magnetic field in a direction transverse with respect to the longitudinal dimension of the slits in said member and to sense flux changes in said member.

2. A magnetic information storage system as set forth in claim 1 wherein said second means includes a conductor passing through said aperture.

3. A magnetic information storage system as set forth in claim 2 wherein said conductor has a rectangular transverse cross-sectional area.

4. A magnetic information storage system as set forth in claim 3 wherein the transverse cross-sectional area of said conductor is equal to the transverse cross-sectional area of said aperture.

5. A magnetic information storage system comprising:

(a) a magnetic member including a magnetic trough and a magnetic plate in contact with said trough forming hollow tubular element made of material exhibiting different stable states of flux remanence, said member including a slit on each of two opposite sides thereof formed by said trough and said plate, the length of each of said slits being greater than the width of said magnetic plate, (b) first means for applying a first magnetic field to said member in a direction transverse with respect to the direction of the length of the slits, (c) second means applying a second magnetic field directed transverse with respect to said first field which is of insufficient magnitude to cause an appreciable flux change in the first state, said first and second magnetic fields being applied concurrently to establish said member in a second state of flux to represent a second information value, and (d) third means operative to apply a third magnetic field in a direction transverse with respect to the direction of the length of the slit in said member and to sense flux changes in said member.

6. A magnetic information storage system as set forth in claim 5 wherein said second means includes a conductor passing through each of said slits.

7. A magnetic information storage system as set forth in claim 6 wherein said conductor has a rectangular transverse cross-sectional area.

8. A magnetic information storage system as set forth in claim 7 wherein the transverse cross-sectional area of said conductor is equal to the area of one of said slits.

9. A magnetic information storage system comprising:

a magnetic member made of material exhibiting different stable states of flux remanence having a first aperture extending longitudinally through the member in a first direction;

said magnetic member having a second aperture extending therethrough in a second direction essentially at right angles to said first direction and forming a slit in each of two opposite sides of said member;

the distance between said said two slits in said magnetic member being less than the length of either one of said slits;

and means for storing information in said magnetic member and for reading out information stored in said member comprising a first conductor extending in said first direction through said first aperture and a second conductor extending in said second direction through said second aperture.

10. A magnetic information storage system as set forth in claim 9 wherein said second conductor has a rectangular transverse cross-sectional area.

References Cited by the Examiner

UNITED STATES PATENTS

| | | | |
|---|---|---|---|
| 3,077,021 | 2/1963 | Brownlow | 340—174 |
| 3,102,999 | 9/1963 | Bernemyr | 340—174 |
| 3,134,096 | 5/1964 | Bartkus | 340—174 |
| 3,142,048 | 7/1964 | Smith | 340—174 |
| 3,175,200 | 3/1965 | Hoffman | 340—174 |

BERNARD KONICK, *Primary Examiner.*

IRVING L. SRAGOW, *Examiner.*

M. S. GITTES, *Assistant Examiner.*